US010431089B1

(12) United States Patent
Nguyen

(10) Patent No.: US 10,431,089 B1
(45) Date of Patent: Oct. 1, 2019

(54) CROWDSOURCED VEHICLE HISTORY

(71) Applicant: Lytx, Inc., San Diego, CA (US)

(72) Inventor: Vincent Nguyen, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 0 days.

(21) Appl. No.: 15/816,803

(22) Filed: Nov. 17, 2017

(51) Int. Cl.
| | |
|---|---|
| *G08G 1/16* | (2006.01) |
| *B60W 40/09* | (2012.01) |
| *G06F 16/903* | (2019.01) |
| *G07C 5/00* | (2006.01) |
| *G05D 1/00* | (2006.01) |
| *B60Q 9/00* | (2006.01) |
| *G07C 5/02* | (2006.01) |
| *B60W 50/14* | (2012.01) |

(52) U.S. Cl.
CPC ............... *G08G 1/161* (2013.01); *B60Q 9/00* (2013.01); *B60W 40/09* (2013.01); *B60W 50/14* (2013.01); *G05D 1/0061* (2013.01); *G06F 16/90335* (2019.01); *G07C 5/008* (2013.01); *G07C 5/02* (2013.01); *G08G 1/166* (2013.01); *G08G 1/167* (2013.01); *B60W 2050/146* (2013.01); *B60W 2420/52* (2013.01); *B60W 2540/30* (2013.01)

(58) Field of Classification Search
USPC ......................................................... 701/117
See application file for complete search history.

(56) References Cited

U.S. PATENT DOCUMENTS

| | | | | | |
|---|---|---|---|---|---|
| 2004/0073361 | A1* | 4/2004 | Tzamaloukas | ..... | G01C 21/3691 701/414 |
| 2004/0193347 | A1* | 9/2004 | Harumoto | ........... | B60R 21/0132 701/45 |
| 2010/0020169 | A1* | 1/2010 | Jang | ........ | G01C 21/36 348/115 |
| 2010/0245064 | A1* | 9/2010 | Fleishman | ............. | G07C 5/008 340/425.5 |
| 2012/0083960 | A1* | 4/2012 | Zhu | ......... | G06T 7/521 701/23 |
| 2014/0279707 | A1* | 9/2014 | Joshua | ............... | G06Q 30/0283 705/400 |
| 2015/0057891 | A1* | 2/2015 | Mudalige | .............. | B60W 10/00 701/42 |
| 2016/0159366 | A1* | 6/2016 | Tsuyunashi | ........... | B60W 40/09 340/439 |
| 2017/0113689 | A1* | 4/2017 | Gordon | ............... | B60W 30/182 |
| 2017/0305434 | A1* | 10/2017 | Ratnasingam | ........ | B60W 40/09 |

* cited by examiner

*Primary Examiner* — Tyler D Paige
(74) *Attorney, Agent, or Firm* — Van Pelt, Yi & James LLP

(57) ABSTRACT

A system for interacting with data of a vehicle history database includes an interface and a processor. The interface is configured to receive sensor data associated with one or more nearby vehicles. The processor is configured to determine vehicle data associated with the one or more nearby vehicles based at least in part on the sensor data; provide the vehicle data to a vehicle history database; receive vehicle history data associated with the one or more nearby vehicles from the vehicle history database; and indicate a feedback action based at least in part on the vehicle history data.

14 Claims, 11 Drawing Sheets

CROWDSOURCED VEHICLE HISTORY

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder typically includes a set of sensors, e.g., video recorders, audio recorders, accelerometers, gyroscopes, vehicle state sensors, GPS (global positioning system), etc., that report data, which is used to determine the occurrence of an anomalous event. Sensor data can then be transmitted to an external reviewing system. This system can improve safety in the long run by identifying unsafe habits of the driver of the vehicle. However, accidents can be caused by other vehicle drivers as well. Safety would be further improved if the system were capable of identifying unsafe habits of other drivers on the road.

BRIEF DESCRIPTION OF THE DRAWINGS

Various embodiments of the invention are disclosed in the following detailed description and the accompanying drawings.

DETAILED DESCRIPTION

Figure 1:
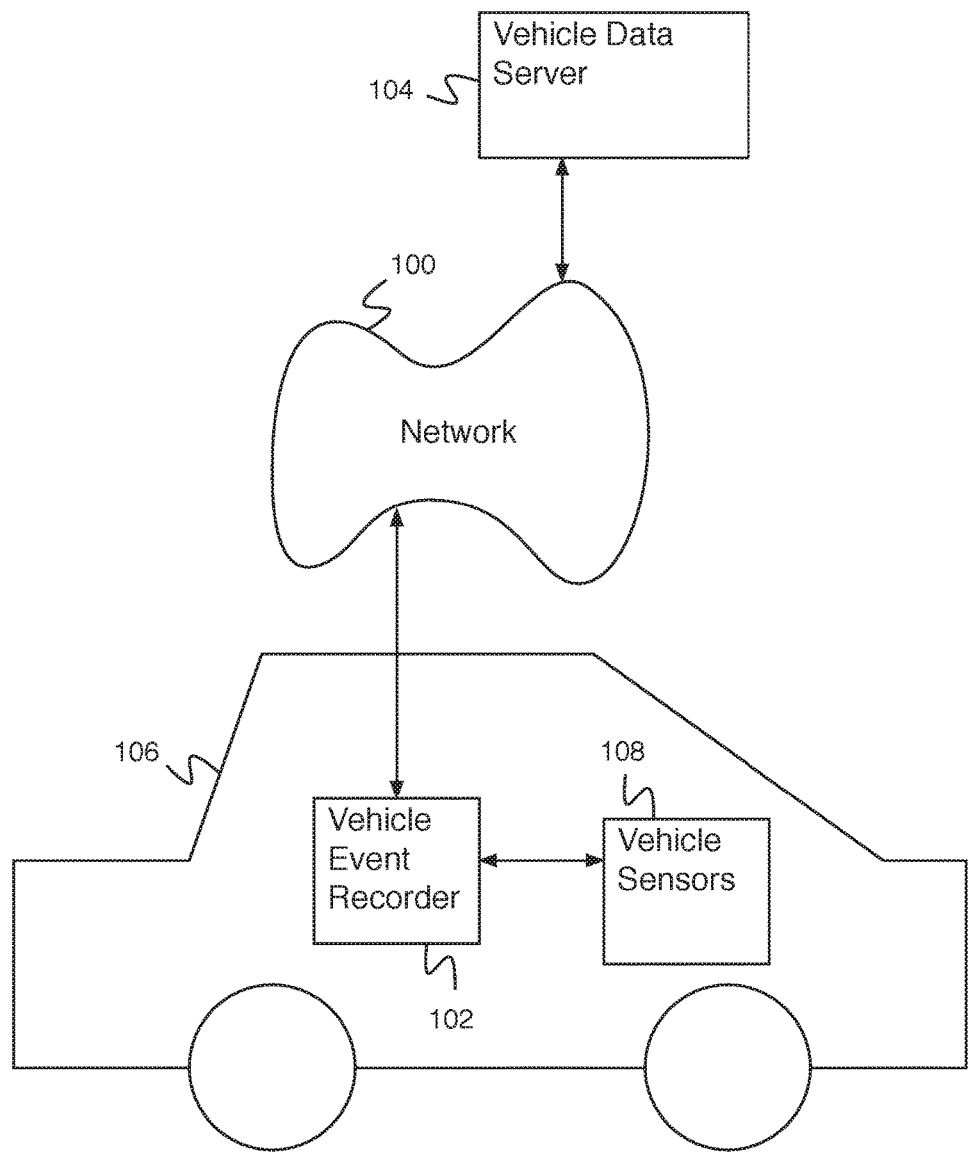
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for interacting with data of a vehicle history database is disclosed. The system comprises an interface and a processor. The interface is configured to receive sensor data associated with one or more nearby vehicles. The processor is configured to determine vehicle data associated with the one or more nearby vehicles based at least in part on the sensor data, provide the vehicle data to a vehicle history database, receive vehicle history data associated with the one or more nearby vehicles from the vehicle history database, and indicate a feedback action based at least in part on the vehicle history data. The system for interacting with data of a vehicle history database additionally comprises a memory coupled to the processor and configured to provide the processor with instructions.

The system for interacting with data of a vehicle history database system uses crowdsourcing to acquire vehicle history data. The system comprises a vehicle event recorder that is mounted on or in a vehicle, which includes a set of sensors, a processor for processing sensor data, and communications interface for communicating with a networked vehicle history database. As the vehicle drives among other vehicles, the system adds information to the vehicle history database and receive information from the vehicle history database. The vehicle event recorder captures identifying information associated with nearby vehicles, including license plate number, vehicle make, vehicle model, vehicle color, vehicle options, vehicle damage, vehicle modifications, vehicle decorations, etc. The vehicle event recorder additionally captures safety information associated with the nearby vehicles including anomalous event information (e.g., an indication that the vehicle made contact with a stationary object or another moving vehicle, an indication of stopping quickly, following too close, running red lights, changing lanes without signaling, etc.) and driver quality information (e.g., an indication of a driver safety status—for example, a very dangerous driver indication, a slightly dangerous driver indication, a neutral driver indication, an above average driver indication, a very safe driver indication, an autonomous driver indication, etc.). The vehicle event recorder provides the safety information associated with the vehicle identifying information to the vehicle history database for storage. The vehicle history database stores the information and makes it accessible to future queries. The vehicle history database additionally determines previously stored safety information associated with the vehicle identifying information and provides it to the vehicle event recorder. In the event that the safety information indicates that a nearby vehicle has an unsafe driver or is prone to accidents or hazardous maneuvers, the vehicle event recorder indicates a feedback action (e.g., providing an audio or video warning, changing a vehicle control parameter, etc.).

Multiple vehicles of a vehicle fleet (or multiple vehicle fleets) can contribute to the vehicle history database and receive information from the vehicle history database in this way. Each vehicles can receive safety information collected and provided to the vehicle history database by other vehicles thus aggregating information that is observed on the road. In addition, since the information stored to the vehicle history database comprises only public information associated with vehicles observed in public (e.g., no private information associated with the vehicle performing the observation that is communicating with the vehicle history database), the vehicle history database can combine information from different vehicle fleets or organizations without risk of inappropriately mixing identifying information associated with the organizations or members of the organizations.

FIG. 1 is a block diagram illustrating an embodiment of a system including a vehicle event recorder. In the example shown, when vehicle 106 travels on a public street, vehicle sensors 108 capture sensor data describing nearby vehicles (e.g., video data, audio data, radar data, lidar data, etc.). The sensor data is received by vehicle event recorder 102. Vehicle data is determined based at least in part on the sensor data. Vehicle data is provided by vehicle event recorder 102 to vehicle data server 104 via network 100, and vehicle history data is received by vehicle event recorder 102 in response. Vehicle event recorder 102 then indicates a feedback action, if appropriate, based at least in part on the vehicle history data. The feedback action comprises an indication to a driver (e.g., an audio indication, an indication on a display, etc.), putting vehicle 106 in a safe driving mode, adjusting an automatic driving control parameter, adjusting event trigger thresholds, etc. In some cases, vehicle event recorder 102 processes the sensor data prior to sending to vehicle data server 104—for example, vehicle event recorder first determines whether the sensor data indicates that there is a nearby occurrence of an anomalous event (e.g., a collision, a tailgating event, a hard braking event, a lane departure event, a swerving event, etc.) and only in the event that there is an anomalous event does vehicle event recorder 102 provide data to vehicle data server 104. In some cases, vehicle event recorder 102 makes an assessment based on collected data as to the quality of a driver associated with a vehicle is good or bad and provides that assessment to vehicle data server 104 for storage in a vehicle history database. Depending on the anomalous event type, vehicle event recorder 102 determines appropriate associated anomalous event data (e.g., video data, image data, etc.) and provides the anomalous event data to the vehicle data server for storage in the vehicle history database. When the received vehicle history database data associated with the nearby vehicles indicates a nearby driver quality or vehicle event recorder 102 independently determines the nearby driver quality, vehicle event recorder 102 indicates that the nearby vehicle has associated driver quality (e.g., a bad driver or a good driver indication).

Vehicle event recorder 102 comprises a vehicle event recorder mounted in a vehicle (e.g., a car or truck). Vehicle event recorder 102 includes sensors—for example, an accelerometer(s), video camera(s), imaging devices, an audio recorder, a position sensor system (e.g., a satellite position system such as a global position system (GPS)), etc. Vehicle event recorder 102 is in communication with vehicle sensors 108. Vehicle sensors 108 comprises a set of sensors, for example, one or more video recorders, audio recorders, accelerometers, gyroscopes, vehicle state sensors, proximity sensors, a GPS, outdoor temperature sensors, moisture sensors, laser line tracker sensors, etc. Vehicle state sensors comprise internal vehicle state sensors, for example a speedometer, an accelerator pedal sensor, a brake pedal sensor, an engine revolutions per minute (e.g., RPM) sensor, an engine temperature sensor, a headlight sensor, an airbag deployment sensor, driver and passenger seat weight sensors, an anti-locking brake sensor, traction control system sensors, drive wheel speed sensors, shocks sensors, an engine exhaust sensor, a gear position sensor, a cabin equipment operation sensor, etc. Vehicle event recorder 102 comprises a system for receiving and processing sensor data. Processing sensor data comprises filtering data, identifying patterns in data, detecting events, etc. Vehicle event recorder 102 is mounted on vehicle 106 in any appropriate location, for example the chassis, the front grill, the dashboard, the rear-view mirror, the rear window or wall, the floor, etc. There are times when vehicle event recorder 102 comprises multiple units mounted in different locations within vehicle 106 instead of a single unit, particularly when there are space constraints for a given location (e.g., behind the rear view mirror) and more space is required to house electronic components. Vehicle event recorder 102 comprises a communications system for communicating with network 100. Network 100 comprises a network for communications. Network 100 comprises one or more of a wireless network, a wired network, a cellular network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a local area network, a wide area network, the Internet, etc. There are instances when network 100 comprises multiple networks, for instance, multiple interconnected networks spanning different regions, networks operating at different times, overlaid networks with different access permissions, bandwidth, etc. Different networks comprising network 100 typically comprise different bandwidth cost (e.g., a wired network has a very low cost, a wireless Ethernet connection has a moderate cost, a cellular data network has a high cost). In some embodiments, network 100 has a different cost at different times (e.g., a higher cost during the day and a lower cost at night). Vehicle event recorder 102 communicates with vehicle data server 104 via network 100.

Figure 2:
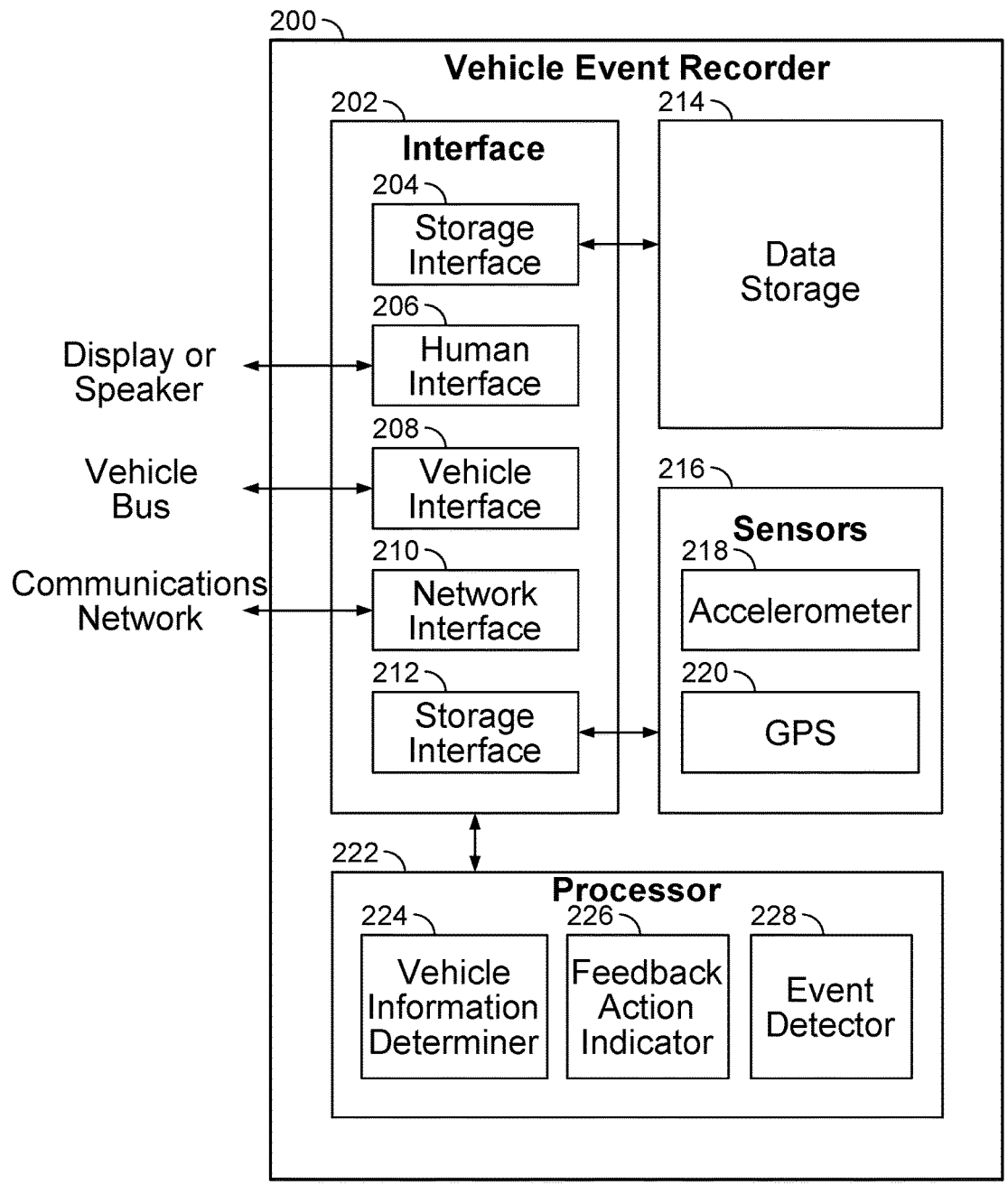
FIG. 2 is a block diagram illustrating an embodiment of a vehicle event recorder.

FIG. 2 is a block diagram illustrating an embodiment of a vehicle event recorder. In some embodiments, vehicle event recorder 200 of FIG. 2 comprises vehicle event recorder 102 of FIG. 1. In the example shown, vehicle event recorder 200 monitors sensor signals from internal sensors 216 (e.g., accelerometer 218 or global position sensor (GPS) 220) or from vehicle sensors via vehicle interface 208. Sensor data is processed using vehicle information determiner 224 to determine information about vehicles nearby. Sensor data is also processed using event detector 228 to determine events associated with vehicles nearby. Events and vehicle information are stored in data storage 214 via storage interface 204 along with relevant raw data from sensors. Events, vehicle information, and relevant raw data from sensors is transferred to a vehicle history database of a vehicle data server. The vehicle data server identifies data associated with the nearby vehicles and provides the data back to vehicle event recorder 200. In the event that data associated with nearby vehicles warrants it, feedback action indicator 226 of processor 222 indicates to a driver of the vehicle via human interface 206 a warning associated with a nearby vehicle. Feedback action indicator 226 also indicates to event detector 228 or vehicle information determiner 224 changes in detection thresholds (e.g., more sensitive thresholds for vehicles with bad behavior indications, less sensitive thresholds for vehicles with good behavior indications, etc.).

Vehicle event recorder 200 communicates with a vehicle data server using network interface 210 (e.g., using a wired or wireless network such as a WiFi™ or cellular network). Vehicle event recorder 200 transmits sensor data, vehicle data, vehicle identification data, anomalous event data, driver quality data, etc. to the vehicle data server. Vehicle event recorder 200 receives vehicle history data from the vehicle data server in response to vehicle data. Feedback action indicator 216 determines and indicates a feedback action based at least in part on the vehicle history data. Vehicle event recorder 200 comprises interface 202. Interface 202 comprises a set of interfaces to other systems. Human interface 206 comprises an interface to a human interaction system—for example, an audio output (e.g., a speaker), a display output, etc. Sensor interface 212 comprises an interface to one or more sensors for receiving sensor data. Sensor interface 212 comprises an interface to one or more vehicle event recorder sensors. In various embodiments, vehicle event recorder sensors comprise an exterior video camera, an exterior still camera, an interior video camera, an interior still camera, a microphone, an accelerometer, a gyroscope, an outdoor temperature sensor, a moisture sensor, a laser line tracker sensor, or any other appropriate sensors. Vehicle interface 208 interfaces with vehicle state sensors possibly including a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, shocks sensors, an engine exhaust sensor, a gear position sensor, a turn signal sensor, a cabin equipment operation sensor, or any other appropriate vehicle state sensors. In some embodiments, vehicle interface 208 comprises a connection to a vehicle bus such as an on-board diagnostics (OBD) bus (e.g., society of automotive engineers (SAE) J1939, J1708/J1587, OBD-II, CAN BUS, etc.). In some embodiments, vehicle event recorder 200 communicates with vehicle state sensors via the OBD bus.

Vehicle interface 208 further comprises an interface to one or more vehicle systems (e.g., for adjusting vehicle control parameters, for putting the vehicle in a safe mode, for adjusting an automatic driving control parameter, etc.). Network interface 210 comprises a network interface for communicating with other systems via a network. Network interface 210 comprises one or more of a GSM interface, a CDMA interface, an LTE interface, a WiFi interface, an Ethernet interface, a Universal Serial Bus (USB) interface, a Bluetooth™ interface, an Internet interface, etc. Processor 222 comprises a processor for controlling the operations of vehicle event recorder 200, for reading and writing information on data storage 214, for reading and/or writing data via interface 202, etc. Processor 222 comprises vehicle information determiner 224 for determining vehicle information from data. Vehicle information comprises vehicle identifying information, an anomalous event indication, a driver quality indication, etc. Feedback action indicator 226 comprises a feedback action indicator for determining and indicating a feedback action based on vehicle history information. Data storage 214 comprises a data storage (e.g., a random access memory (RAM), a read only memory (ROM), a nonvolatile memory, a flash memory, a hard disk, or any other appropriate data storage). Data storage 214 comprises a data storage for storing instructions for processor 222, vehicle event recorder data, vehicle event data, sensor data, video data, driver scores, vehicle information, vehicle identifying information, anomalous event information, driver quality information, etc.

Figure 3:
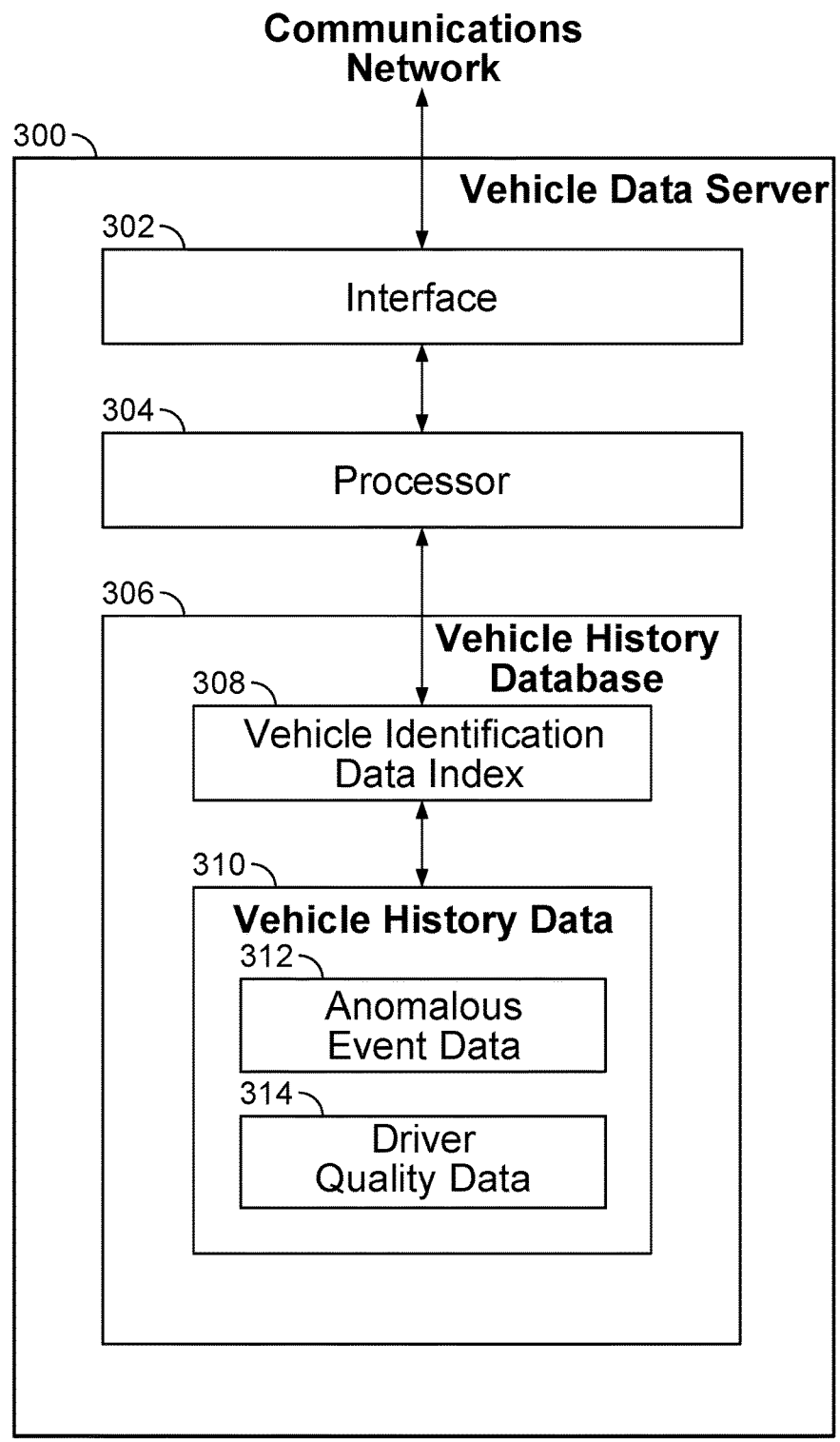
FIG. 3 is a block diagram illustrating an embodiment of a vehicle data server.

FIG. 3 is a block diagram illustrating an embodiment of a vehicle data server. In some embodiments, vehicle data server 300 of FIG. 3 comprises vehicle data server 104 of FIG. 1. In the example shown, vehicle data server 300 receives via a communications network using interface 302 vehicle data information including event data, vehicle information, and raw data associated with vehicles nearby a vehicle that has a mounted vehicle event recorder. The vehicle data information is added to vehicle history database 306 and indexed using vehicle identification data index 308. Processor 304 is used to identify driver quality or anomalous events associated with each of the nearby vehicles and then return an indication or other relevant data back to the vehicle that sent the vehicle information data. Driver quality or anomalous events are also stored in vehicle history database 306 associated with vehicle identification data as well as vehicle data. The indication is used by the vehicle event recorder that sent the vehicle information data to adjust settings of the vehicle event recorder and to indicate to the driver of the vehicle warnings. Also, the vehicle event recorder can inform the associated vehicle that adjustments be made to vehicle systems (e.g., autonomous systems, braking systems, etc.) adjusting triggers or other systems based on the indication. For example, if a nearby vehicle is indicated to make sudden stops then the driver can be warned in the event that the vehicle is in front of the driver's vehicle, if a vehicle is indicated to make sudden lane changes then the driver can be warned in the event that the vehicle is beside or in front of the vehicle in a neighboring lane, etc.

Vehicle data server 300 comprises interface 302 for communicating with a network and processor 304 for processing data, determining vehicle identification data from sensor data, providing commands to interface 302 and vehicle history database 306, etc.

Vehicle history database 306 comprises vehicle identification data index 308 and vehicle history data 310. Vehicle identification data index 308 comprises an index for accessing data from vehicle history data 310. Vehicle history data 312 comprises anomalous event data 312 and driver quality data 314. Anomalous event data 312 comprises a set of anomalous event indications and/or anomalous event summary data. Anomalous event indications comprise indications of vehicle accident events, hazardous driving events, illegal driving events, near miss events, etc. Anomalous event summary data comprises indications derived from anomalous event indications—for example, a driver follows too close indication, a driver likely to shift lanes without signaling indication, driver stops suddenly indication, etc. Driver quality data comprises data indicating a driver quality level—for example, very dangerous driver indication, a slightly dangerous driver indication, a neutral driver indication, an above average driver indication, a very safe driver indication. The driver quality indication can additionally comprise an autonomous driver indication.

Figure 4:
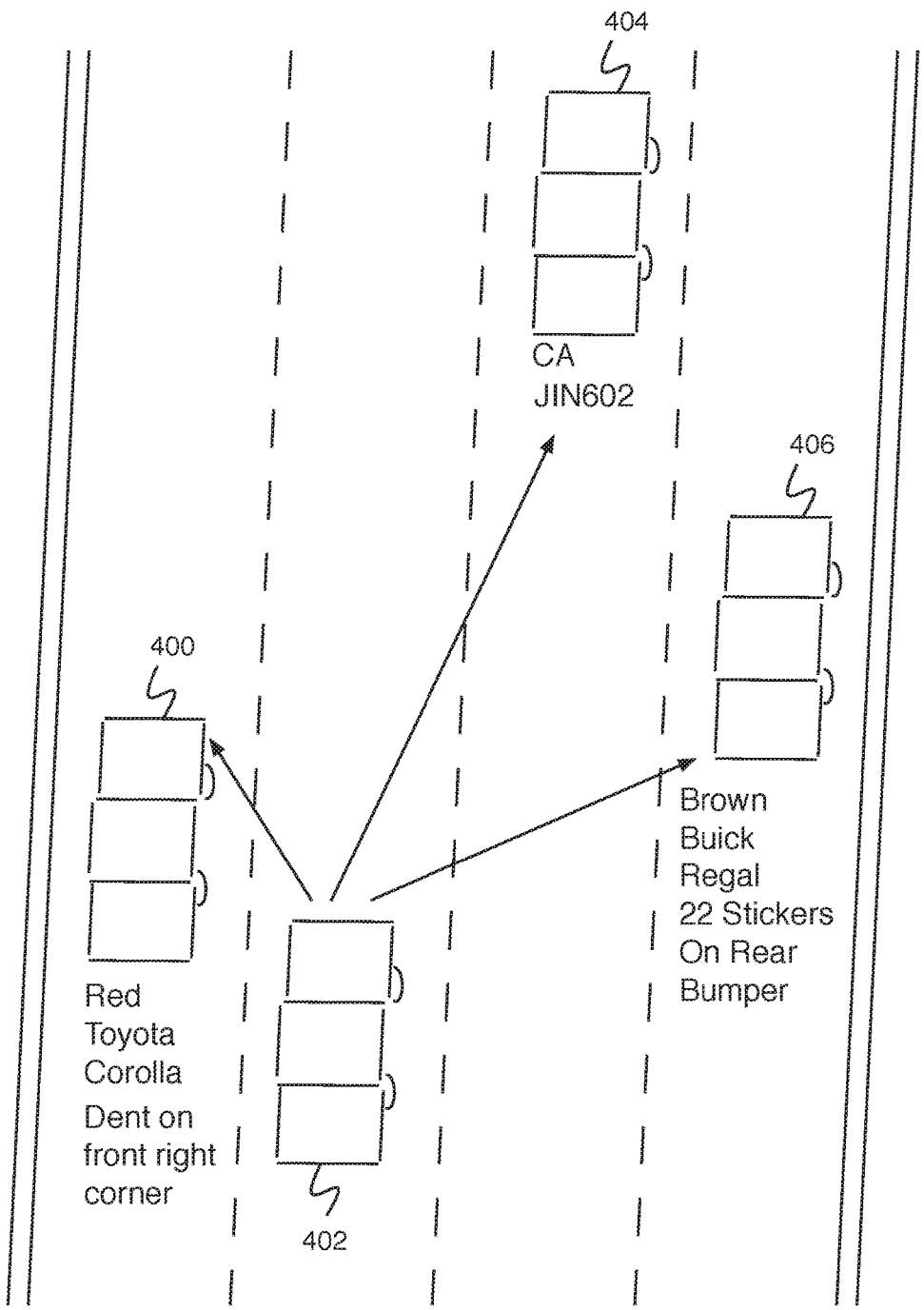
FIG. 4 is a diagram illustrating an embodiment of a vehicle identification data determination.

FIG. 4 is a diagram illustrating an embodiment of a vehicle identification data determination. In some embodiments, a vehicle identification data determination is performed by a vehicle event recorder (e.g., vehicle event recorder 102 of FIG. 1). In the example shown, vehicle 402 is driving on a freeway and identifies vehicle identification data describing three other vehicles on the same freeway. Identification of vehicle identification data is performed by analyzing data from one or more cameras mounted on vehicle 402. In the example shown, video data of vehicle 400 is analyzed and used to determine that vehicle 400 comprises a red Toyota Corolla including a dent on its front right corner. When data processing, storage, and bandwidth constraints permit, data describing the dent size, shape and location is additionally determined and stored. Video data of vehicle 404 is analyzed and used to determine that the license plate number of vehicle 404 is California plate JIN602. If possible, the color, make, and model of vehicle 404 are also determined. Video data of vehicle 406 is analyzed and used to determine that vehicle 406 comprises a brown Buick Regal with 22 stickers on its rear bumper. When data processing, storage, and bandwidth constraints permit, image data of the stickers and data describing their location are additionally determined and stored. This vehicle identification data is stored by the vehicle event recorder and provided via a network to a vehicle data server comprising a vehicle history database. In the event vehicle history data associated with any of the vehicles (e.g., vehicle 400, vehicle 404, or vehicle 406) is determined, the associated vehicle history data is provided to the vehicle event recorder via the network. In the event an anomalous event or a driver quality indication is observed associated with any of the vehicles, the anomalous event or a driver quality indication is provided associated with the vehicle identification data for storage in the vehicle history database.

Figure 5:
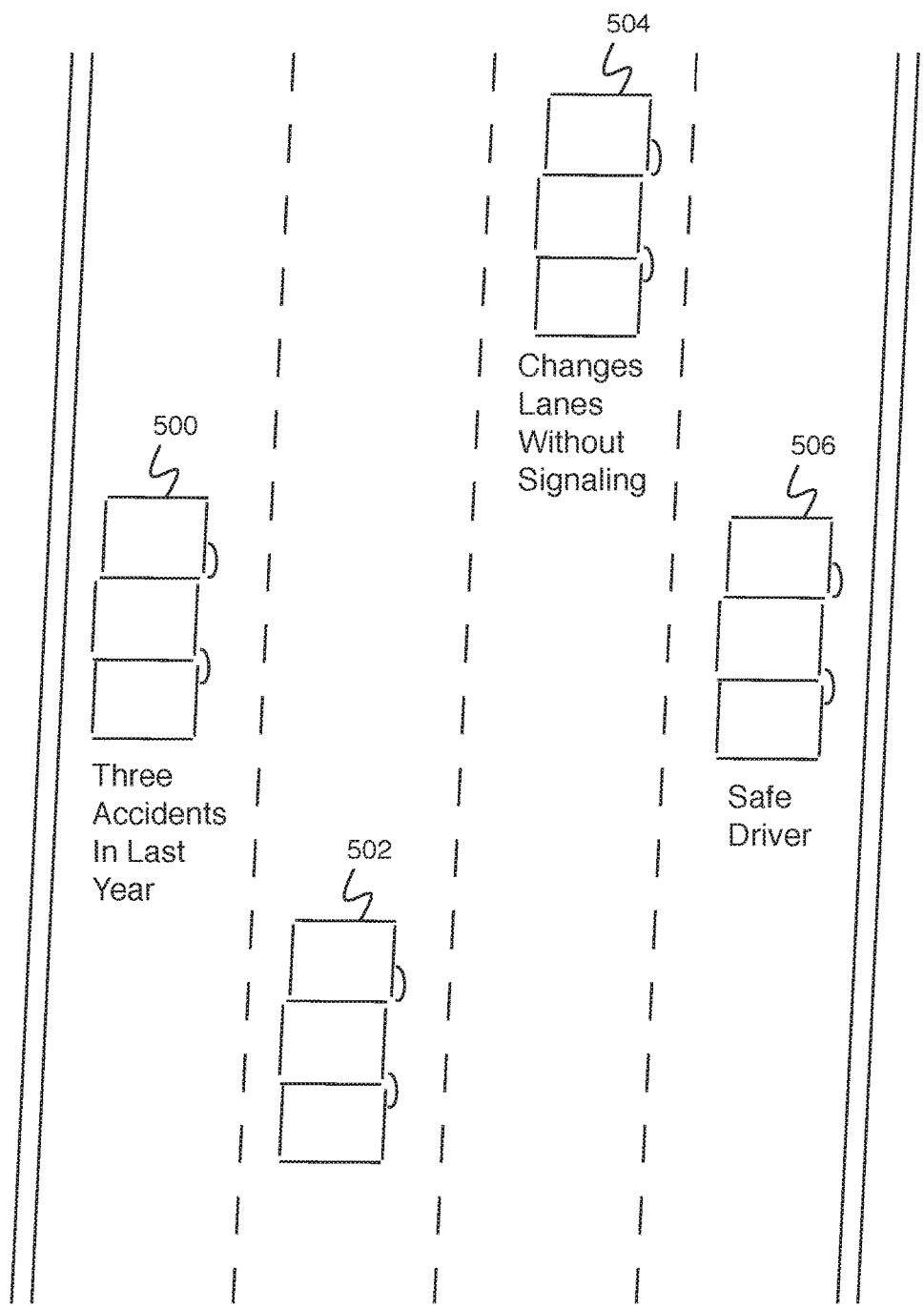
FIG. 5 is a diagram illustrating an embodiment of vehicle history data.

FIG. 5 is a diagram illustrating an embodiment of vehicle history data. In some embodiments, the vehicle history data shown in FIG. 5 comprises vehicle history data received from a vehicle history database in response to vehicle identification data. In some embodiments, the diagram of FIG. 5 comprises a visual display of vehicle history data for presentation to a driver (e.g., a display on a vehicle mounted video display, a heads-up display, etc.). In the example shown, vehicle history data comprises vehicle history data provided to the driver of vehicle 502 describing the history of surrounding vehicles. Vehicle history data indicates that vehicle 500 has had three accidents in the last year, that vehicle 504 typically changes lanes without signaling, and that vehicle 506 comprises a vehicle with a safe driver.

Figure 6:
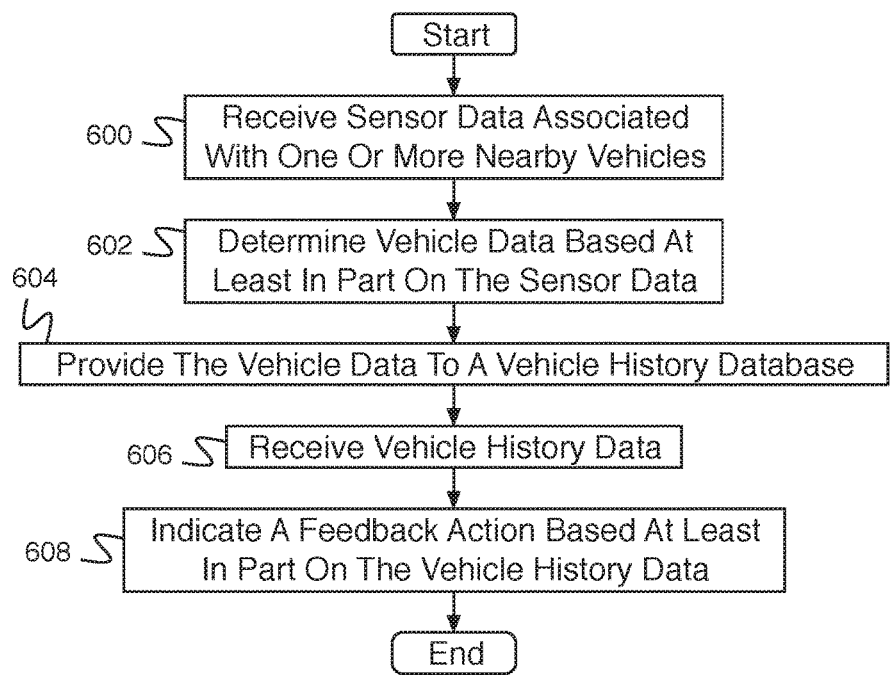
FIG. 6 is a flow diagram illustrating an embodiment of a process for interacting with data of a vehicle history database.

FIG. 6 is a flow diagram illustrating an embodiment of a process for interacting with data of a vehicle history database. In some embodiments, the process of FIG. 6 is executed by a vehicle event recorder (e.g., vehicle event recorder 102 of FIG. 1). In the example shown, in 600, sensor data associated with one or more nearby vehicles is received. In 602, vehicle data based at least in part on the sensor data is determined. For example, vehicle data associated with the one or more nearby vehicles is determined based at least in part on the sensor data. In 604, the vehicle data is provided to a vehicle history database. In 606, vehicle history data is received. For example, vehicle history data associated with the one or more nearby vehicles is received from the vehicle history database. In 608, a feedback action is indicated based at least in part on the vehicle history data.

In some embodiments, data collection information is additionally received. For example, data collection information indicates a frequency of data collection, a type of data to collect, a location for data collection, or one or more of vehicles for data collection.

Figure 7:
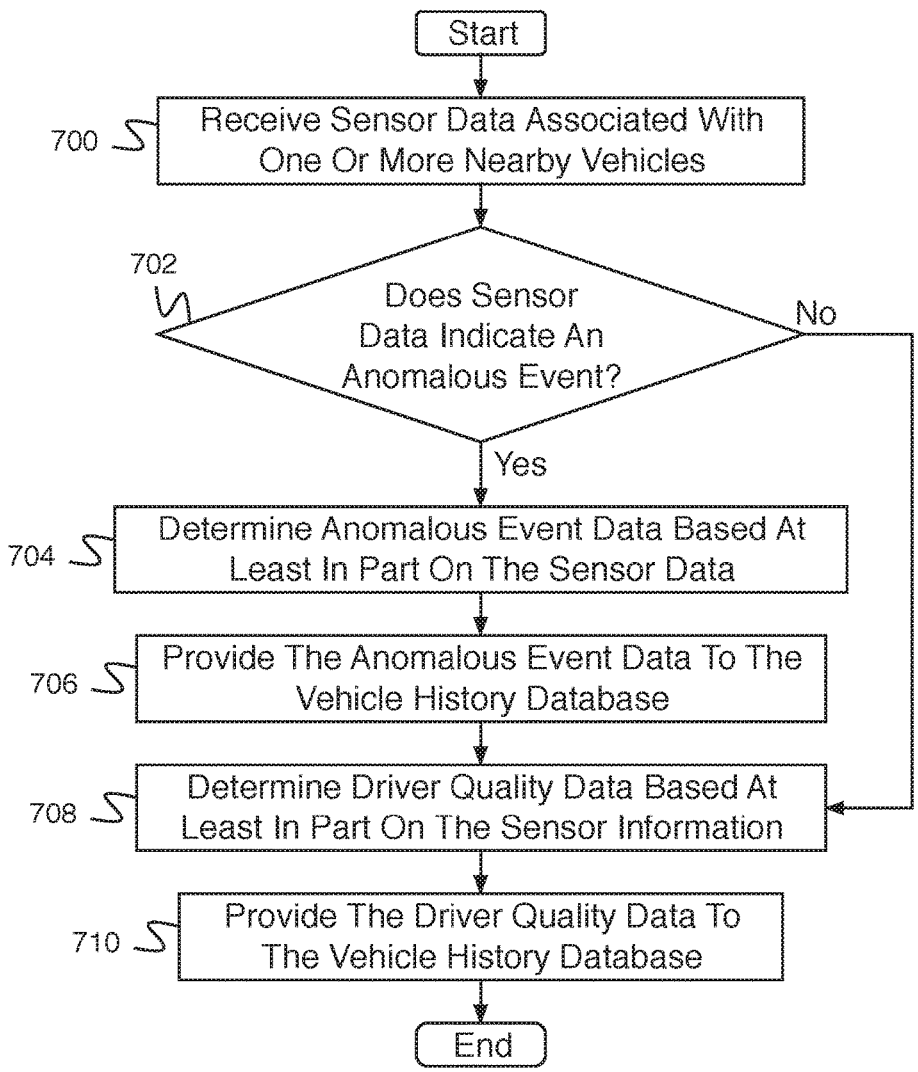
FIG. 7 is a flow diagram illustrating an embodiment of a process for adding data to a vehicle history database.

FIG. 7 is a flow diagram illustrating an embodiment of a process for adding data to a vehicle history database. In some embodiments, the process of FIG. 7 is executed by a vehicle event recorder (e.g., vehicle event recorder 102 of FIG. 1). In the example shown, sensor data associated with one or more nearby vehicles is received. In 702, it is determined whether sensor data indicates an anomalous event (e.g., an accident, a hazardous maneuver, an illegal maneuver, an event indicating driver distraction, etc.). In the event it is determined that sensor data does not indicate an anomalous event, control passes to 708. In the event it is determined that sensor data indicates an anomalous event, control passes to 704. In 704, anomalous event data is determined based at least in part on the sensor data. For example, anomalous event data comprises data indicating a vehicle tailgating, data indicating a vehicle running a red light, data indicating a vehicle changing lanes without signaling, data indicating a vehicle causing an accident, data indicating a vehicle speeding, data indicating a vehicle hard cornering, data indicating a vehicle abruptly braking, data indicating a vehicle cutting off other vehicles, data indicating a vehicle at an unusual location, data indicating a vehicle weaving, etc. In 706, the anomalous event data is provided to the vehicle history database. In 708, driver quality data is determined based at least in part on the sensor information. For example, the driver quality data comprises a very dangerous driver indication, a slightly dangerous driver indication, a neutral driver indication, an above average driver indication, a very safe driver indication, or an autonomous driver indication. In 710, the driver quality data is provided to the vehicle history database.

Figure 8:
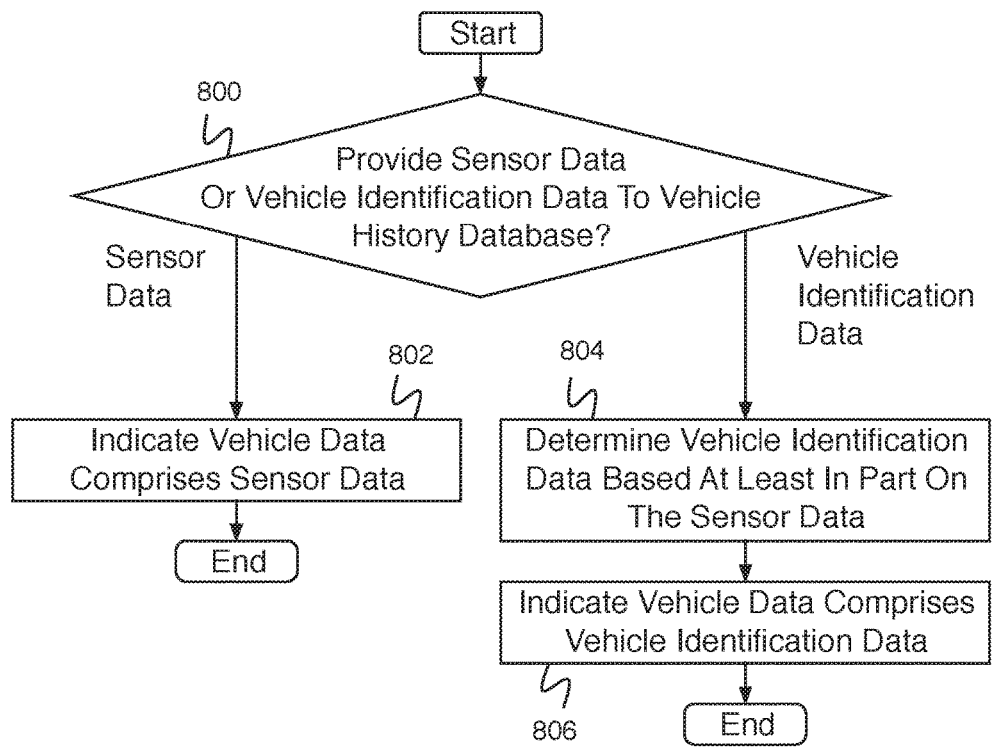
FIG. 8 is a flow diagram illustrating an embodiment of a process for determining vehicle data based at least in part on sensor data.

FIG. 8 is a flow diagram illustrating an embodiment of a process for determining vehicle data based at least in part on sensor data. In some embodiments, the process of FIG. 8 implements 602 of FIG. 6. In the example shown, in 800, it is determined whether to provide sensor data or vehicle identification data to a vehicle history database. Vehicle identification data is provided when data processing constraints allow vehicle information to be determined from sensor data by the vehicle event recorder (e.g., when the vehicle event recorder is powerful enough). In the event it is determined to provide sensor data to the vehicle history database, control passes to 802. In 802, the process indicates that the vehicle data comprises the sensor data, and the process ends. In 800, in the event it is determined to provide vehicle identification data to the vehicle history database, control passes to 804. In 804, vehicle identification data based at least in part on the sensor data is determined. For example, vehicle identification data comprises vehicle make data, vehicle model data, vehicle color data, license plate data, vehicle damage data, vehicle decoration data, vehicle option data, or vehicle modification data. In 806, the process indicates that vehicle data comprises the vehicle identification data, and the process ends.

In some embodiments, vehicle identification data and sensor data are both provided to a vehicle data server.

Figure 9:
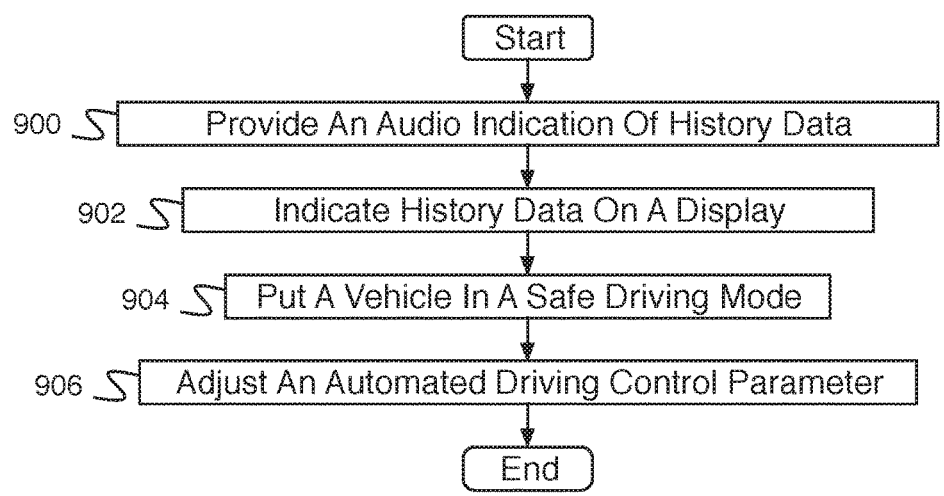
FIG. 9 is a flow diagram illustrating an embodiment of a process for indicating a feedback action based at least in part on history data.

FIG. 9 is a flow diagram illustrating an embodiment of a process for indicating a feedback action based at least in part on history data. In some embodiments, the process of FIG. 9 implements 608 of FIG. 6. In the example shown, in 900, an audio indication of history data is provided. In 902, history data is indicated on a display. For example, history data is indicated on a dash mounted display, on a heads-up display, etc. In 904, a vehicle is put in safe driving mode. In 906, an automated driving control parameter is adjusted. In some embodiments, a subset of the steps of FIG. 9 are executed. For example, one of the steps of FIG. 9 is executed, two of the steps of FIG. 9 are executed, etc.

Figure 10:
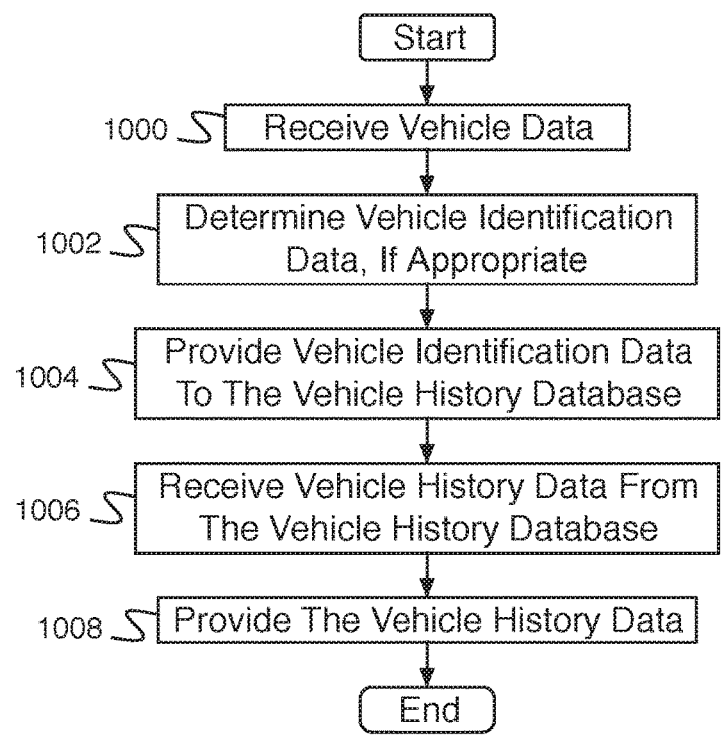
FIG. 10 is a flow diagram illustrating an embodiment of a process for providing vehicle history information.

FIG. 10 is a flow diagram illustrating an embodiment of a process for providing vehicle history information. In some embodiments, the process of FIG. 10 is executed by a vehicle data server (e.g., vehicle data server 104 of FIG. 1). In the example shown, in 1000, vehicle data is received. For example, sensor data regarding nearby vehicles is received from internal and vehicle associated sensors. In 1002, vehicle identification data is determined, if appropriate. For example, vehicle identification data is determined in the event that a vehicle event recorder has sufficient processing power and the vehicle data comprises sensor data. In 1004, vehicle identification data is provided to the vehicle history database. For example, a vehicle event recorder sends data to a vehicle data server. In 1006, vehicle history data is received from the vehicle history database. For example, vehicle history data comprises previously observed anomalous event data or driver quality data (e.g., previously observed by a vehicle event recorder and transmitted to the vehicle data server). Vehicle history information additionally comprises derived vehicle history information. For example, derived vehicle history information comprises an indication of a vehicle likely to drive recklessly, a vehicle likely to tailgate, a vehicle likely to speed, a vehicle likely to change lanes without signaling, a vehicle likely to cause an accident, etc. In 1008, vehicle history data is provided. For example, a driver is provided with vehicle history data via a human interface (e.g., a display, an audio interface, etc.).

Figure 11:
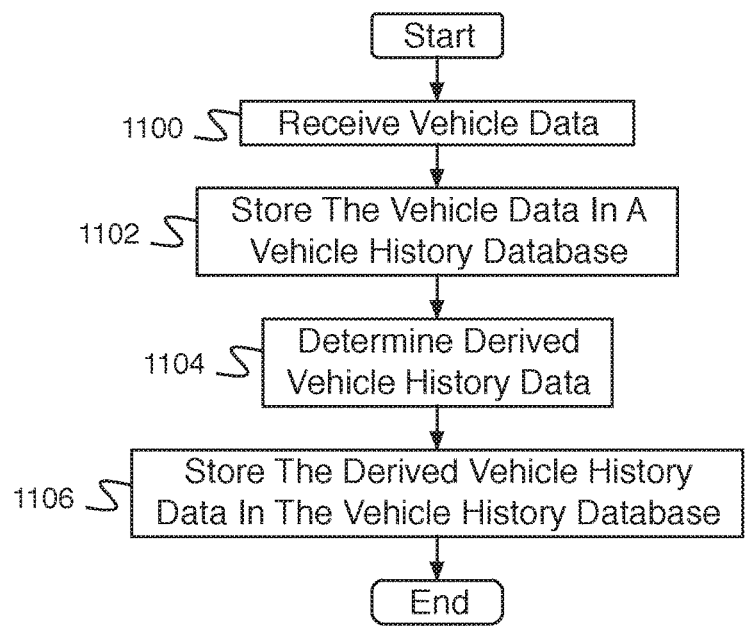
FIG. 11 is a flow diagram illustrating an embodiment of a process for adding vehicle history information to a vehicle history database.

FIG. 11 is a flow diagram illustrating an embodiment of a process for adding vehicle history information to a vehicle history database. In some embodiments, the process of FIG. 11 is executed by a vehicle data server (e.g., vehicle data server 104 of FIG. 1). In the example shown, in 1100, vehicle data is received. For example vehicle data comprises vehicle identification data, anomalous event data, driver quality data, etc. In 1102, vehicle data is stored in a vehicle history database. In 1104, derived vehicle history data is determined. For example, derived vehicle history data comprises data derived from vehicle data stored in the vehicle history database (e.g., by combining multiple stored anomalous events to determine a driver tendency, by averaging driver quality data to determine an average driver quality, etc.). In 1106, the derived vehicle history data is stored in the vehicle history database.

In some embodiments, a collection of data associated with an identified nearby vehicle is determined and located in the vehicle history database and provided back to a vehicle. In some embodiments, data associated with a plurality of nearby vehicles is identified and provided back to the vehicles.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for interacting with data of a vehicle history database, comprising:
   an interface configured to receive sensor data associated with one or more nearby vehicles; and
   a processor configured to:
   determine vehicle data associated with the one or more nearby vehicles based at least in part on the sensor data;
   determine anomalous event data based at least in part on the sensor data, wherein the anomalous event data comprises data indicating a vehicle tailgating, data indicating a vehicle running a red light, data indicating a vehicle changing lanes without signaling, data indicating a vehicle causing an accident, data indicating a vehicle speeding, data indicating a vehicle hard cornering, data indicating a vehicle abruptly braking, data indicating a vehicle cutting off other vehicles, data indicating a vehicle at an unusual location, or data indicating a vehicle weaving;
   determine driver quality data based at least in part on the sensor data;
   provide the vehicle data, the driver quality data, and the anomalous event data to a vehicle history database;
   receive vehicle history data associated with the one or more nearby vehicles from the vehicle history database; and
   indicate a feedback action based at least in part on the vehicle history data, wherein the feedback action comprises providing an audio indication of a dangerous vehicle, indicating a dangerous vehicle on a display, putting a vehicle into a safe driving mode, adjusting an automatic driving control parameter, or any combination thereof.

2. The system of claim 1, wherein the driver quality data comprises a very dangerous driver indication, a slightly dangerous driver indication, a neutral driver indication, an above average driver indication, a very safe driver indication, or an autonomous driver indication.

3. The system of claim 1, wherein the vehicle history data comprises previously observed anomalous event data.

4. The system of claim 1, wherein the vehicle history data comprises an indication of a vehicle likely to drive recklessly, a vehicle likely to tailgate, a vehicle likely to speed, a vehicle likely to change lanes without signaling, or a vehicle likely to cause an accident.

5. The system of claim 1, wherein the vehicle history data comprises an indication of an autonomous vehicle.

6. The system of claim 1, wherein the sensor data comprises video data from a video camera, video data from multiple video cameras, audio data, radar data, or lidar data.

7. The system of claim 1, wherein the vehicle data comprises the sensor data.

8. The system of claim 1, wherein the vehicle data comprises vehicle identification data based at least in part on the sensor data.

9. The system of claim 8, wherein the vehicle identification data comprises vehicle make data, vehicle model data, vehicle color data, license plate data, vehicle damage data, vehicle decoration data, vehicle option data, or vehicle modification data.

10. The system of claim 1, wherein the vehicle history database comprises data received from a plurality of observation vehicles.

11. The system of claim 1, wherein the vehicle history database comprises data received from vehicles associated with a plurality of participating organizations.

12. The system of claim 1, wherein the processor is further configured to receive data collection information, wherein the data collection information indicates a frequency of data collection, a type of data to collect, a location for data collection, or one or more vehicles for data collection.

13. A method for interacting with data of a vehicle history database, comprising:

receiving sensor data associated with one or more nearby vehicles;

determining, using a processor, vehicle data with the one or more nearby vehicles based at least in part on the sensor data;

determining anomalous event data based at least in part on the sensor data, wherein the anomalous event data comprises data indicating a vehicle tailgating, data indicating a vehicle running a red light, data indicating a vehicle changing lanes without signaling, data indicating a vehicle causing an accident, data indicating a vehicle speeding, data indicating a vehicle hard cornering, data indicating a vehicle abruptly braking, data indicating a vehicle cutting off other vehicles, data indicating a vehicle at an unusual location, or data indicating a vehicle weaving;

determining driver quality data based at least in part on the sensor data;

providing the vehicle data, the driver quality data, and the anomalous event data to a vehicle history database;

receiving vehicle history data associated with the one or more nearby vehicles form the vehicle history database; and indicating a feedback action based at least in part on the vehicle history data, wherein the feedback action comprises providing an audio indication of a dangerous vehicle, indicating a dangerous vehicle on a display, putting a vehicle into a safe driving mode, adjusting an automatic driving control parameter, or any combination thereof.

14. A computer program product for interacting with data of a vehicle history database, the computer program product being embodied in a non-transitory computer readable storage medium and comprising computer instructions for:

receiving sensor data associated with one or more nearby vehicles;

determining vehicle data associated with the one or more nearby vehicles based at least in part on the sensor data;

determining anomalous event data based at least in part on the sensor data, wherein the anomalous event data comprises data indicating a vehicle tailgating, data indicating a vehicle running a red light, data indicating a vehicle changing lanes without signaling, data indicating a vehicle causing an accident, data indicating a vehicle speeding, data indicating a vehicle hard cornering, data indicating a vehicle abruptly braking, data indicating a vehicle cutting off other vehicles, data indicating a vehicle at an unusual location, or data indicating a vehicle weaving;

determining driver quality data based at least in part on the sensor data;

providing vehicle data, the driver quality data, and the anomalous event data to a vehicle history database;

receiving vehicle history data associated with the one or more nearby vehicles from the vehicle history database; and indicating a feedback action based at least in part on the vehicle history data, wherein the feedback action comprises providing an audio indication of a dangerous vehicle, indicating a dangerous vehicle on a display, putting a vehicle into a safe driving mode, adjusting an automatic driving control parameter, or any combination thereof.

* * * * *